United States Patent [19]
Cruttwell et al.

[11] 3,946,361
[45] Mar. 23, 1976

[54] IMAGE ANALYSIS

[75] Inventors: Ian Andrew Cruttwell, Dalgety Bay, Scotland; David Theo Smith, Royston, England

[73] Assignee: Image Analysing Computers Limited, England

[22] Filed: June 17, 1974

[21] Appl. No.: 480,098

[30] Foreign Application Priority Data
June 20, 1973  United Kingdom............... 29237/73
Dec. 5, 1973   United Kingdom............... 56315/73

[52] U.S. Cl.............. 340/146.3 AC; 235/92 PC; 340/146.3 CA
[51] Int. Cl.² ........................................ G01N 15/00
[58] Field of Search ........ 235/92 PC; 340/146.3 AC

[56] References Cited
UNITED STATES PATENTS
| | | | |
|---|---|---|---|
| 3,720,812 | 3/1973 | Downs .......................... | 235/92 PC |
| 3,795,792 | 3/1974 | Gibbons et al.................. | 235/92 PC |
| 3,805,028 | 4/1974 | Morton .......................... | 235/92 PC |

*Primary Examiner*—Leo H. Boudreau
*Attorney, Agent, or Firm*—Oblon, Fisher, Spivak, McClelland & Maier

[57] ABSTRACT

An image analysis system is described in which the video signal information is processed so that only the measurements on any one feature are delivered to the output during any one frame scan.

In a modification, the function of the computing circuit performing the measurements on the signals arising from scanning the features is changed from frame scan to frame scan until a complete programme of different parameter measurements has been performed on the signals relating to one feature (one parameter being dealt with during each frame scan). The analysis is then transferred to the next feature in the field as outlined above and the same programme of measurements is carried out on the next feature.

In a further modification a portion of the video signal containing signals relating to the end of a feature is stored for a number of frame scan periods and is substituted for the corresponding portion arising during the subsequent frame scans, so that the position of the end of the selected feature is fixed whilst the different parameter measurements are made thereon.

14 Claims, 8 Drawing Figures

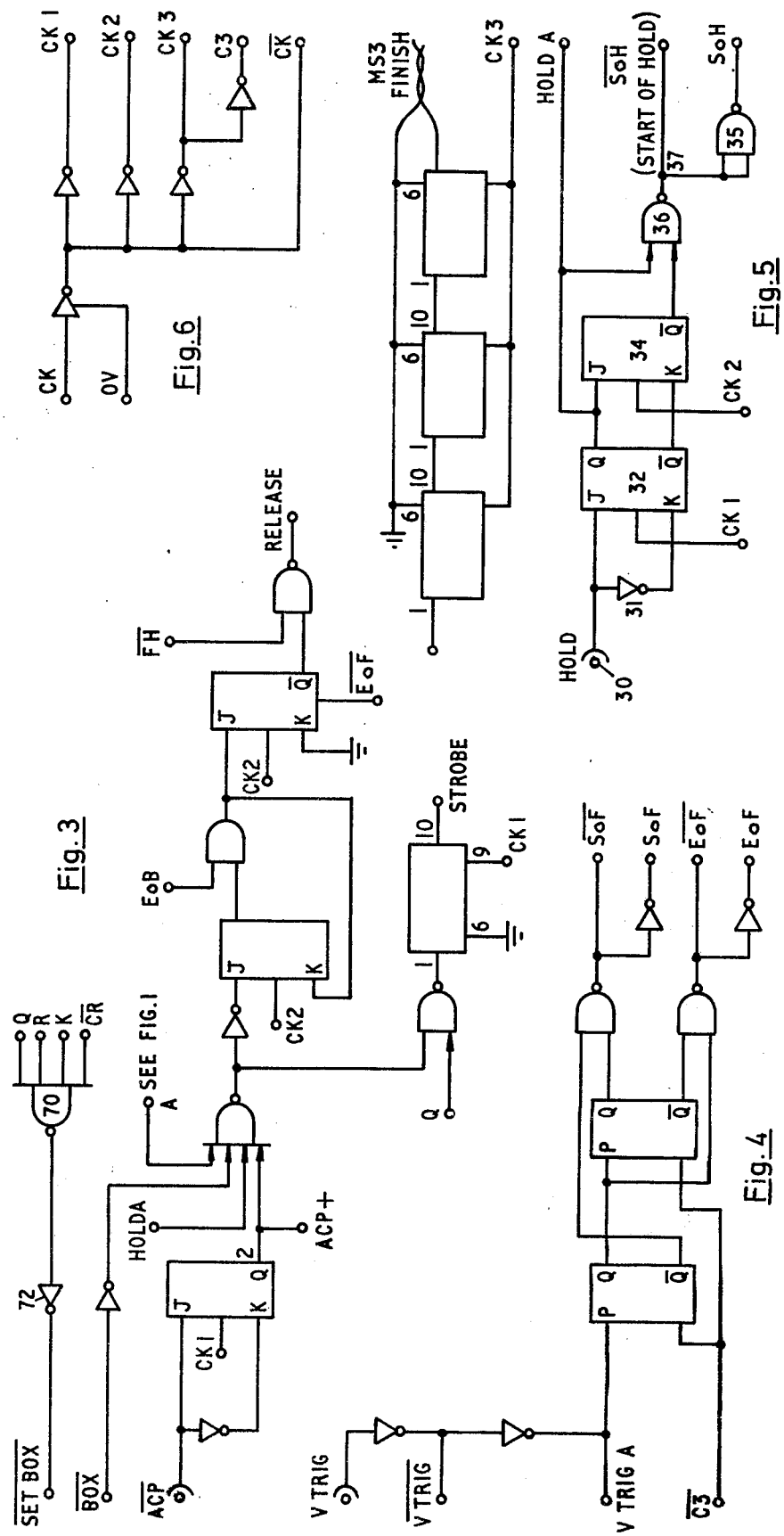

IMAGE ANALYSIS

This invention concerns image analysis systems in which a field of view is scanned for example by a television camera to produce a video signal which is subjected to detection to produce constant amplitude detected signal pulses on which measurements can be made.

A computing system is described in U.S. Pat. No. 3,619,494 in which the detected signal pulses from a suitable detector are used to control an ACP signal generating circuit and also comprise the input to a so-called associated parameter computer which performs measurements on the detected signal pulses. The measured value for each feature is released by the ACP signal generated for that feature so that an electrical signal relating to the measured value for each feature in the field is released in succession during each frame scan.

A development of this computing system is described in U.S. Pat. No. 3,624,604 which illustrates how two associated parameter computers can be operated from a single ACP signal generating circuit to compute two or more value signals for each feature in a field. The arrangement described in that patent allows simultaneous measurements to be made and two or more simultaneous computations to be performed at the position of each ACP signal but it will be appreciated that this involves the duplication of associated parameter computers.

It is an object of the present invention to provide a system whereby a single ACP signal generating circuit and a multi-function computer are employed in conjunction with suitable control equipment to perform multiple parameter measurements per feature during successive frame scans. The present invention therefore provides a method of multiple parameter computation to perform the similar computations as are envisaged in the aforementioned U.S. Pat. No. 3,624,604 but over a longer period of time.

According to the present invention in a method of analysing a field containing features and comprising the steps of scanning the field, generating a video signal corresponding to the field, comparing the video signal amplitude with at least one reference voltage to obtain constant amplitude detected signal pulses, generating from the detected signal pulses relating to each feature an ACP signal therefor after the last detected pulse for the feature, computing a value signal in a computing circuit relating to a parameter of the feature from the detected signal pulses which relate thereto and employing the ACP signal for the feature to release the value signal therefor, the further steps are provided of:

— storing in a first store electrical signals identifying the position of the first ACP signal to occur during an initial frame scan,
— employing the stored signals during a succeeding frame scan to select and store the value signal which is released by the first ACP signal,
— clearing the first store and inserting therein signals identifying the position of the next ACP signal to occur during scanning the field, and
— repeating the sequence of steps to obtain the corresponding value signals for each of the remaining features whose ACP signals are in turn identified.

In this way it is possible to slow down the rate at which parameter value signals of different features are delivered by an image analysing computer to not more than one per frame scan (and to one every $n$ frame scan (where $n$ is $> 2$), if it is desired).

According to a preferred development of the method according to the invention, the following additional steps may also be performed, namely:

— changing the function of the computing circuit to generate a value signal of a different feature parameter during at least one other succeeding frame scan,
— employing the signals stored in said first store to select and store a different value signal released by the first ACP signal during the said at least one other succeeding frame scan, and
— reverting the computing circuit to its first function, before repeating the sequence of steps.

It will be seen that in the preferred development of the method according to the invention, a single computing circuit of the type described in U.S. Pat. No. 3,619,494 can be employed which is controlled to perform a different measurement on the same information supplied to it during each of $n$ successive frame scans ($n$ being a whole number greater than 1) and the computed information from the computing circuit which will appear in serial form, and is temporarily stored so as to be available in parallel form if required, can be supplied to a further computing circuit of a simple design for performing subsequent computations using two or more of the value signals for the feature to allow pattern recognition or form separation functions to be performed.

The results of the subsequent computations may be employed to select other signals arising from the scanning features for further computation depending on shape characteristics or other measurable characteristics of the features (thus for example count pulses can be accumulated according to the shape features).

According to a preferred feature of the invention the information which is stored in the first store and identifies the position of an ACP signal, defines an area of the scanned field rather than the point at which the ACP signal is released. In this way registration inaccuracies between successive frame scans arising from noise and other factors can be reduced.

A method of stabilising the information from one frame scan to the next comprises the steps of storing in a second store during a said initial scan, signals arising just before and during production of a selected ACP signal, during subsequent scans releasing the stored signals in place of the corresponding signals which arise during the same interval in said subsequent frame scans, re-circulating the released signals to said storage means to be available for later ones of said subsequent frame scans and clearing said second store when said first store is cleared to render said second store available to store a fresh set of signals associated with the position of the next selected ACP signal.

The signals which are stored in the second store may be the actual video signals obtained from the scanning device or a digitised version thereof or may be the detected signal pulses obtained by comparing the video signal amplitude with a reference voltage.

According to another preferred feature of the invention a preliminary computation is performed on the detected signal pulses from each selected feature and a "pass" or "fail" signal is generated depending on whether the results of the preliminary computation satisfy a given criterion. If a "pass" signal is generated for the feature the analysis proceeds to that feature as soon as said first store is cleared. In the event of a "fail" signal being generated for the preliminary computation on the detected signal pulses for any ACP signal, a further signal is generated to cancel the information identifying the position of that ACP signal and to cause the system to search for the next following ACP signal thereby reducing the total time required for the analysis.

Apparatus for performing the invention comprises means for scanning a field containing features and generating a video signal corresponding to the field, means for comparing the video signal amplitude with at least one reference voltage to obtain constant amplitude detected signal pulses corresponding to the detected features in the field, circuit means responsive to the detected signal pulses for generating an ACP signal for each detected feature after the last detected signal pulse for the feature, a computing circuit adapted to compute a value signal relating to a parameter of a detected feature from the detected signal pulses which relate thereto and responsive to the ACP signal for the feature to release the value signal therefor, first signal storage means for storing electrical signals identifying the position of the first ACP signal to occur during an initial frame scan, means for releasing the stored signals from the first store during a succeeding frame scan, circuit means responsive to the released signals to select and transmit the value signal which is released by the first ACP signal, means for clearing the first store and inserting therein signals identifying the position of the next ACP signal to occur during scanning the field and means for causing the apparatus to repeat the sequence of operations to obtain the corresponding value signals for each of the remaining features whose ACP signals are in turn identified.

Apparatus for performing the said preferred development of the method according to the invention comprises means for changing the function of the computing circuit to generate a value signal of a different feature-parameter during at least one other succeeding frame scan, the signals stored in said first store serving to select and store in said further storage means the different value signal released by the ACP signal during said at least one other succeeding frame scan, and means for reverting the computing circuit to its first function before repeating the sequence of steps.

An image analysis system typically includes a microscope or other imaging device and according to a further preferred feature of the invention an electrical signal is generated which inhibits operation of the system until the microscope stage is steady, the field is correctly focused, and all other factors which could affect the accuracy of the video signal and detected video signal pulses are at least static.

According to a further preferred feature of the invention a terminate signal is generated after the last value signal has been obtained for the last feature in a field to be analysed, to step the microscope stage by one field of view in the appropriate direction so as to present automatically the next part of the specimen for analysis.

DESCRIPTION OF THE DRAWINGS

The invention will now be described by way of example with reference to the accompanying drawings, in which.

DETAILED DESCRIPTION OF THE DRAWINGS

Figure 1:
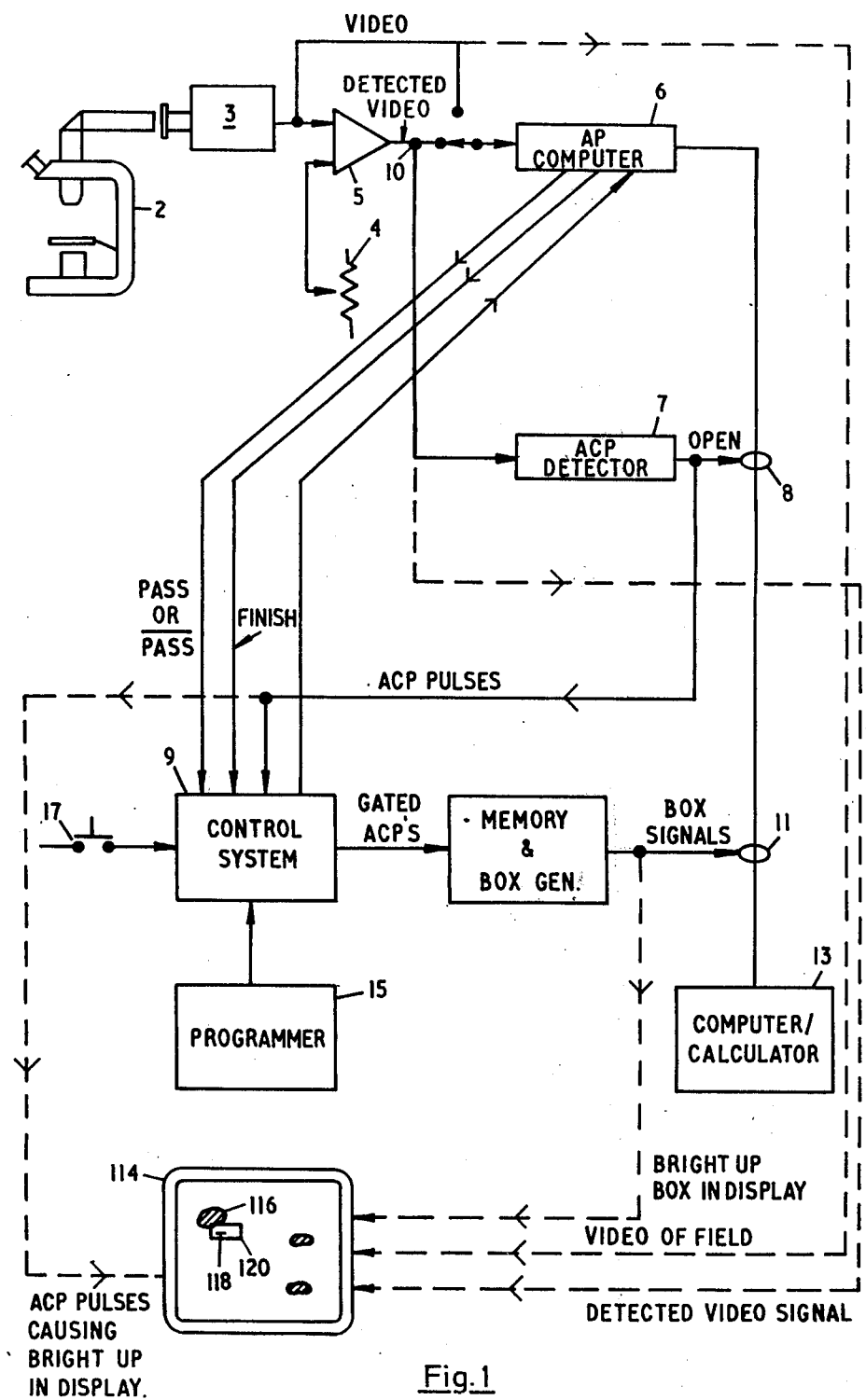
FIG. 1 is a block circuit diagram of a complete system incorporating the invention.

Referring first to FIG. 1 an optical microscope 2 set to view a specimen presents a field of view to a television camera 3 which produces a video signal for comparison with a reference voltage from a potentiometer 4 in a comparator 5. The output of the comparator is a series of constant amplitude pulses whose durations correspond to the durations of the video signal amplitude excesses over the reference voltage and are hereinafter referred to as detected signal pulses.

As described in our U.S. Pat. Nos. 3,619,494 and 3,624,604, detected signal pulses can be used to determine a unique point in relation to each feature in the field known as the anti-coincidence point abbreviated to ACP and a circuit for generating an electrical pulse at this point referred to as the ACP pulse and sometimes abbreviated to ACP is described in our U.S. Pat. No. 3,619,494. The same pulses can be used as input signals for a special purpose computer one form of which is described in our British Patent Specification No. 1,264,805 whereby a parameter of a feature such as area, parameter etc. can be computed using the information contained in the detected signal pulses. By using the special purpose computer described in the aforementioned Specification, the value signal relating to the particular parameter is available at the same instant in time as the ACP for the feature and by using the ACP pulse to open a gate, the information can be released at the appropriate instant during the scan of the field.

As described in our U.S. Pat. No. 3,624,604 two or more associated parameter computers may be employed each performing a different function and separately controlled by a single anti-coincidence point detector since the value signal for each parameter for each signal will be available at the same instant in time i.e. the ACP for the feature.

In FIG. 1 the junction 10 is intended to correspond to the junction shown in FIG. 1 of each of the two aforementioned U.S. Patents and referring more specifically to FIG. 3 of our aforementioned U.S. Pat. No. 3,624,604, the detected signal pulses at junction 10 are supplied in one case to a function computer of the type enclosed in the dotted outline labelled 18 in FIG. 3 of the aforementioned patent, thereby to compute from the detected signal pulses a parameter of the feature such as area, etc. and to generate an electrical signal whose value is proportional to the value of the parameter so measured. In FIG. 1 of the present application the function computer is labelled 6.

The detected signal pulses at junction 10 are also supplied to an ACP detection circuit which forms the remainder of the circuit shown in FIG. 3 of our aforementioned U.S. Pat. No. 3,624,604 and is also enclosed in a dotted line in that figure. In the present application the ACP detector is denoted by circuit box 7 in FIG. 1. The output from the ACP detector comprises a short duration electrical pulse at each anti-coincidence point in the field and this is employed to open a gate reference numeral 8 in FIG. 1 to release the value signal or associated parameter signal for the feature computed by function computer 6. This gate corresponds to the gate 68 in FIG. 3 of our U.S. Pat. No. 3,624,604 and gate 36 in FIG. 1 of our U.S. Pat. No. 3,619,494.

In accordance with the invention a control system 9 is provided which in turn controls the function of the computer 6 and the opening and closing of a further gate 11 which controls the passage of the value signals released by gate 8 to a second computer or calculator 13 adapted to receive two or more different value signals from succeeding frame scans for a feature and to compute therefrom a secondary associated parameter such as a shape factor value or the like. The system in FIG. 1 also shows the provision of a programming device 15 which provides overall control for the system and is shown as supplying control signals to the control system 9. In addition a manual start push button switch is shown at 17 whereby an override signal may be generated to initiate an analysis sequence other than that simply provided by the programming device 15.

As discussed in the two aforementioned U.S. Patents, the function computer or as it is sometimes called associated parameter computer 6 can be adapted to compute any one of a range of measurements on a feature. Thus the area of a feature may be computed by summing the total length of all the detected signal pulses arising from scanning a feature. Where these have been digitised into trains of pulses of constant frequency by a master clock pulse oscillator the action of summing is simply that of counting all the constant frequency pulses arising during the scanning of the feature. The horizontally projected height of a feature can be obtained by generating a single count pulse for each detected signal pulse for each feature and summing the count pulses so obtained. The vertically projected length of the feature may be obtained by summing the length of the detected signal pulses obtained during scanning of a feature and ignoring those which overlap when viewed perpendicular to the line scan direction.

The function computer 6 is therefore adapted so that it can be switched to measure any one of a plurality of such parameters and the control system 9 generates a series of signals in conjunction with the programming device 15 to instruct the computer 6 to perform the appropriate function on the detected signal pulses received thereby during each of a succession of frame scans.

Figure 2:
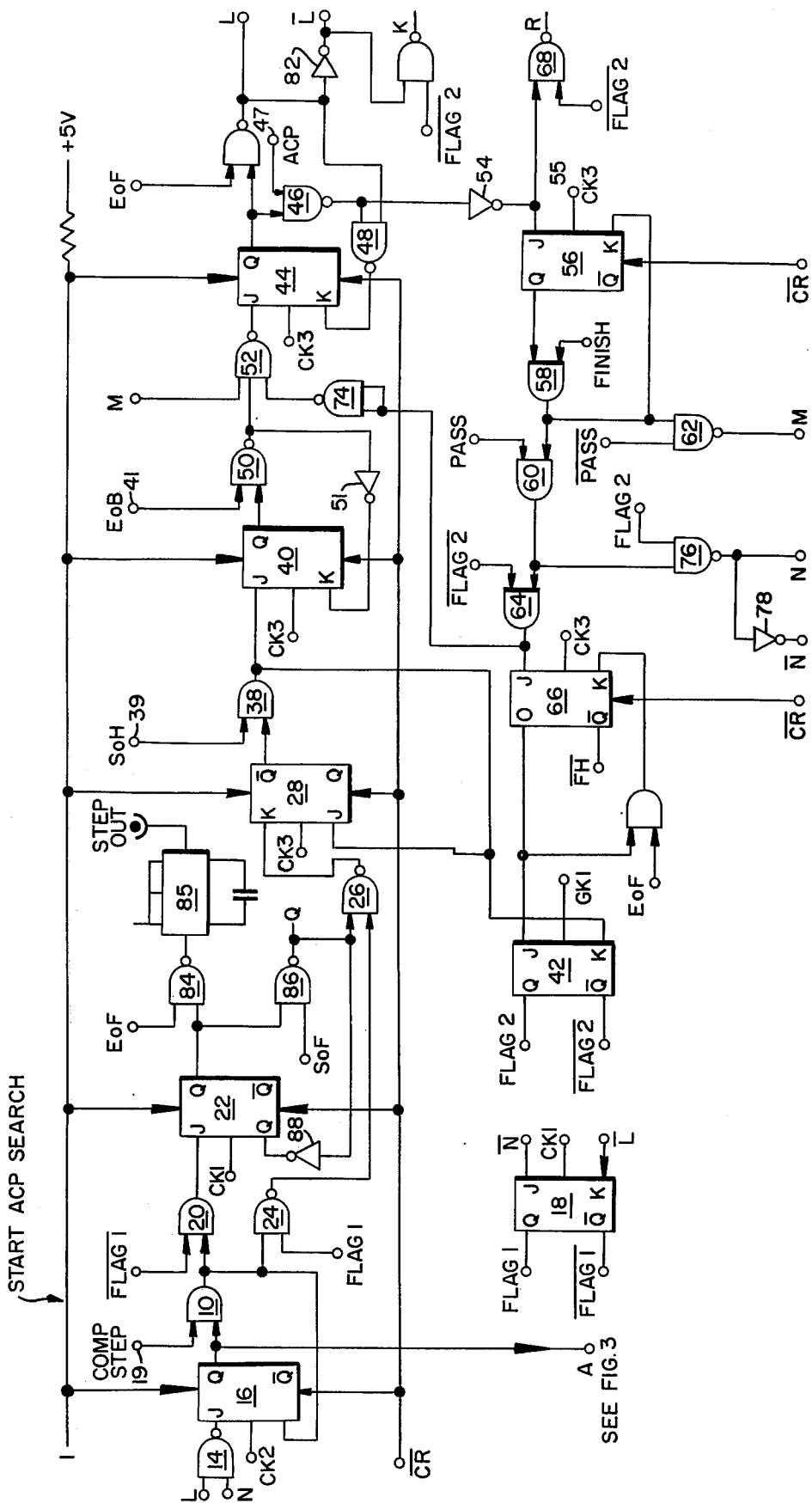
FIG. 2 is a block circuit diagram illustrating in more detail the control system of FIG. 1, FIGS. 3, 4, 5 and 6 are block circuit diagrams of further parts of the control system of FIG. 1 and illustrate how some of the control pulses therefor are generated.

The detail of the control system 9 is shown in FIG. 2. The circuit will be best understood by a description of the operation of the circuit and since the circuit is in the form of a loop the operation will be described on the assumption that the apparatus has already located one ACP in the field and has recorded this information and generated the appropriate area referred to as a "box" around the position of the located ACP and the function computer 6 is performing the various measurements on the detected signal pulses from the comparator 5.

At some time during the frame scanning period signal L or N will go to zero and NAND-gate 14 will produce a one signal at 16J. At the next clock pulse bistable 16 will set and a one condition will obtain at 16Q.

AND-gate 10 will be fully satisfied when a one condition is applied to junction 19 either from the programmer 15 indicating that the system is to search for the next ACP or a signal from the manual start switch 17 of FIG. 1. When satisfied AND-gate 10 produces a one condition which is used to reset bistable 16 at the next clock pulse on CK2 and applies a one condition to one of the inputs of each of AND-gate 20 and NAND-gate 24.

During a frame scan period signal L is high and therefore signal $\overline{L}$ will be zero. In consequence bistable 18 will be in the set condition and 18Q will be at condition one denoted by Flag 1. Flag 1 will therefore be zero and no output will appear in AND-gate 20 but the output of NAND-gate 24 will go to zero for the duration of one clock pulse and will cause the output of NAND-gate 26 to rise during the same clock interval to apply a reset condition to 28K. At the next clock pulse on CK3 bistable 28 will be reset and a one condition will appear at $28\overline{K}$. This will partly enable AND-gate 38 which is fully enabled when a one condition appears at junction 39.

Referring to FIG. 5 a control signal for junction 39 is derived from a Hold signal applied to junction 30. The appearance of a one condition at junction 30 indicates that the optics, stage, focussing etc. have all been set correctly and the video signal now being produced by the camera or other scanning device is suitable for analysis. The action of inverting amplifier 31 is to cause both bistables 22 and 34 to normally be in a reset condition so that $34\overline{K}$ is at a one level. With the appearance of a one condition at junction 30 bistable 32 is set at the appearance of the next clock pulse on CK1. The one condition at $32\overline{K}$ causes bistable 34 to be set at the appearance of the next clock pulse on CK2. Since there will be a time lag between the two clock pulses a one condition will appear on both inputs to the NAND-gate 36 for a short period of time causing the output at junction 37 to drop to zero for that same period of time. The action of the NAND-gate 35 is to invert the negative going pulse and produce a short duration positive pulse labelled SOH which is applied to junction 39 in FIG. 2.

At the appearance of this short duration pulse, AND-gate 38 is fully satisfied and its output rises to a one condition causing bistable 40 to be set at the next clock pulse on CK3. The same one condition is applied to 42K so that at the next clock pulse on CK1, bistable 42 is reset so that the signal labelled Flag 2 is 0 and $\overline{\text{Flag 2}}$ is 1.

As will be described hereinafter, a set of gating signals are generated defining what is referred to as a box around each ACP in the scan raster. A signal is generated at the end of the sequence of gating pulses defining the box and this signal is applied to junction 41 and is labelled EOB. The signal causes junction 41 to rise to a one condition for a short period of time. If the EOB signal appears after bistable 40 has been set, NAND-gate 50 will produce a zero signal at its output for the same short duration of time causing one of the inputs to NAND-gate 52 (which is connected as an OR-gate) to drop to zero. It can be assumed that the three inputs to NAND-gate 52 are normally high and the appearance of the zero condition in the output of NAND-gate 50 causes the output of NAND-gate 52 to rise to the one condition. At the next clock pulse on CK3 bistable 44 is therefore set.

An inverting amplifier 51 is provided the action of which is to cause the bistable 40 to be reset at the next clock pulse on CK3 after NAND-gate 50 output has dropped to zero.

With bistable 44 in its set condition 44Q is at the one level and this appears at one of the inputs to NAND-gate 46. The ACP signals appearing in the output of detector 7 are applied to the other input of NAND-gate 46 and the output of this NAND-gate will drop to zero as soon as the next ACP signal is received from the detector 7 (see FIG. 1) after the bistable 44 has been set. The zero condition is inverted by amplifier 54 to produce a short duration pulse at junction 55 causing bistable 56 to be set at the next clock pulse on CK3.

The output of NAND-gate 46 serves as one input to NAND-gate 48 and when the zero condition exists in the output of NAND-gate 46, a one state exists in the output of NAND-gate 48. This serves as a reset signal for bistable 44 which will be reset at the next clock pulse on CK3.

Since bistable 56 has been set, 56K rises to one and partly enables AND-gate 58.

A Finish signal is generated by the computer 6 in conjunction with the programmer 15 to indicate when certain preliminary measurements on the detected signal pulses received by the computer 6 are completed. A second signal known as Pass is also generated at the same instant in time as the Finish signal if the value of the parameter or parameters measured during the initial test measurements on the detected signal pulses relating to this particular ACP satisfy certain limits.

The Finish signal is applied to the other input of AND-gate 58 and the Pass signal is applied to one input of an AND-gate 60 the other input of which is supplied with the output from AND-gate 58. If both Finish and Pass signals are high (indicating that the preliminary tests are completed and that the feature is of interest) a one condition signal is applied to the one input of AND-gate 64. Since bistable 42 is still in its reset condition, $\overline{\text{Flag 2}}$ is still high and both inputs of AND-gate 64 are therefore satisfied so that bistable 66 is set at the next clock pulse on CK3. At this time a one condition will appear at 66K so that bistable 42 will be set at the next clock pulse on CK1. This causes $\overline{\text{Flag 2}}$ to go to 0 and Flag 2 to go to 1.

The zero condition of $\overline{\text{Flag 2}}$ is used to indicate that the coordinates of an ACP have been recorded in a memory (to be described hereinafter) and that there is at least this one feature left in the field to analyse.

Referring back to junction 55 in circuit of FIG. 2 it will be noted that the output of inverting amplifier 54 provides one input to a NAND-gate 68, the other input of which is supplied with the $\overline{\text{Flag 2}}$ signal from bistable 42. The output of NAND-gate 68 will therefore reduce to 0 for the short duration pulse in the output of amplifier 54. Referring again to FIG. 3, the short duration zero condition of signal R causes a short duration one condition of an AND-gate 70 which appears as a short duration zero condition in the output of inverting amplifier 72. This short duration zero condition is used to trigger the memory as will hereinafter be described.

The one condition signal which causes bistable 66 to set is also applied to the inputs of a NAND-gate 74 connected as an inverting amplifier. This causes a short duration zero condition to appear on one of the inputs to NAND-gate 52 which causes bistable 44 to be set causing 44Q to go to one. The next ACP signal received at junction 47 will therefore set NAND-gate 46 output to zero for its duration and this will cause the output of inverting amplifier 54 to rise to 1 during the same period. It will be noted that the output of AND-gate 58 serves as a reset signal for bistable 56 so that on the next clock pulse on CK3 after the Finish signal is applied to the AND-gate 58, bistable 56 is reset. With the appearance of a further one signal at junction 55, bistable 56 will be set once again causing 56K to rise to 1.

In the event that the preceding ACP which has been located has produced value signals which produce both Finish and Pass signals, bistable 42 will have been set and $\overline{\text{Flag 2}}$ will be at 0. In consequence NAND-gate 58 is unaffected by the momentary rise in the output of amplifier 54. No trigger of the memory therefore occurs at the point in the scan corresponding to the next ACP which has appeared. However, measurements are made on the information at this next ACP in the same manner as previously described, to test whether the ACP relates to a feature which is of any interest. If a Pass signal is obtained with the Finish signal for the preliminary measurements made on the information at this next ACP, a one condition will obtain in the output of AND-gate 60 and since bistable 42 is still in its set condition, both inputs to NAND-gate 76 will be high causing the output of this gate to go to 0. Signal $\overline{\text{N}}$ will therefore rise for the duration of the one condition at the output of AND-gate 60 as a result of the inverting action of amplifier 78.

Signal $\overline{\text{N}}$ is applied to the set input of bistable 18 and at the next clock pulse on CK1 bistable 18 will be set causing 18K to rise to 1. This signal is labelled Flag 1 and indicates to the system that there is a further feature in the field whose ACP has not yet been recorded which is of interest.

If the measurements made on the last described ACP do not produce a Pass signal then a one condition appears at one of the inputs of NAND-gate 62 (described as $\overline{\text{Pass}}$ in FIG. 2). This in conjunction with the one condition in the output of AND-gate 58 produced by the Finish signal on that set of measurements, causes the output of AND-gate 62 to drop to 0 for a short period of time. This signal labelled M in FIG. 2 constitutes one of inputs to NAND-gate 52 which therefore causes the output of this latter gate to rise temporarily and bistable 44 is therefore triggered into its set condition at the next clock pulse on CK3. This produces the same result as if a zero condition had been obtained from the output of NAND-gate 50 and the remainder of the circuit therefore seeks the next ACP in the sequence at junction 47 and applies the same tests to the information arising at this next ACP.

If an End of frame signal occurs after a zero condition at 44J but before any further ACP is received at junction 47, then the output of NAND-gate 80 goes to zero which produces a zero signal on input L of NAND-gate 14.

Inverting amplifier 88 produces a zero signal $\overline{\text{L}}$ and this causes bistable 18 to be reset. This produces $\overline{\text{Flag 1}}$ thereby partly enabling AND-gate 20.

At the next clock pulse on CK2 after signal L has gone to zero, the one condition in the output of NAND-gate 14 causes bistable 16 to once again be set and 16Q to rise to one. At the next command signal from junction 19, AND-gate 10 is satisfied but the one condition in its output, instead of triggering NAND-gate 24, fully satisfies AND-gate 20 in view of the reset condition of bistable 18 thereby producing a one signal at 22J. At the next clock pulse on CK1, bistable 22 is triggered into its set condition and the one condition appearing at 22Q appears at one of the two inputs of each of two NAND-gates 84 and 86.

The timing of the system now becomes of paramount importance in an understanding of the subsequent mode of operation.

The sequence of signals at the beginning of each frame scan period is as follows:
1. SOF (start of frame) which is derived from the negative going edge of vertical trigger, see FIG. 3.
2. Commence step — i.e. the signal applied at junction 19.
3. Lastly at the end of the scan is EOF (end of frame) which is derived from the positive going edge of vertical trigger, see FIG. 3.

In consequence of this timing, an EOF signal will appear before an SOF signal after a one condition appears at 22Q. With the appearance of the EOF pulse, the output of NAND-gate 84 drops temporarily and a step-out pulse is generated by a monostable 85, the step-out signal being used to adjust the position of the specimen, or stage, to present another area of the specimen in the field of view of the scanner.

Shortly after the EOF signal, the SOF signal provides a second one condition on the two inputs of NAND-gate 86 and the output of this gate also drops to 0 temporarily. This signal is denoted Q and constitutes one of the inputs to NAND-gate 70 by which the memory (not shown) is addressed via inverting amplifier 72. A signal is therefore stored in the memory corresponding to the position in the scan of the SOF signal.

The short duration zero condition in NAND-gate 86 output also constitutes an input to NAND-gate 26 the other input of which is held at one due to the reset condition of bistable 18. This causes the output of NAND-gate 26 to drop temporarily to 0 thereby causing bistable 28 to be set at the next clock pulse on CK3 and the system is therefore primed ready to start searching for the first ACP in the new field of view after the next SOF signal is received at junction 39.

The reason for setting up this false location in the memory and the generation of the so-called box around this false ACP position, is so that a false EOF signal is available at junction 41 during subsequent frame scans to enable the remaining circuitry to start seeking the first true ACP in the new field of view.

It will be noted that the short duration zero condition in the output of NAND-gate 86 also serves as a reset signal via inverting amplifier 88 for bistable 22 which is therefore reset at the next available clock pulse on CK1.

A common reset line is provided for all the bistables and all these can be reset by a single signal labelled $\overline{CR}$.

FIGS. 4, 5 and 6 illustrate how various other of the control signals for the system shown in FIG. 2 are derived.

Figure 7:
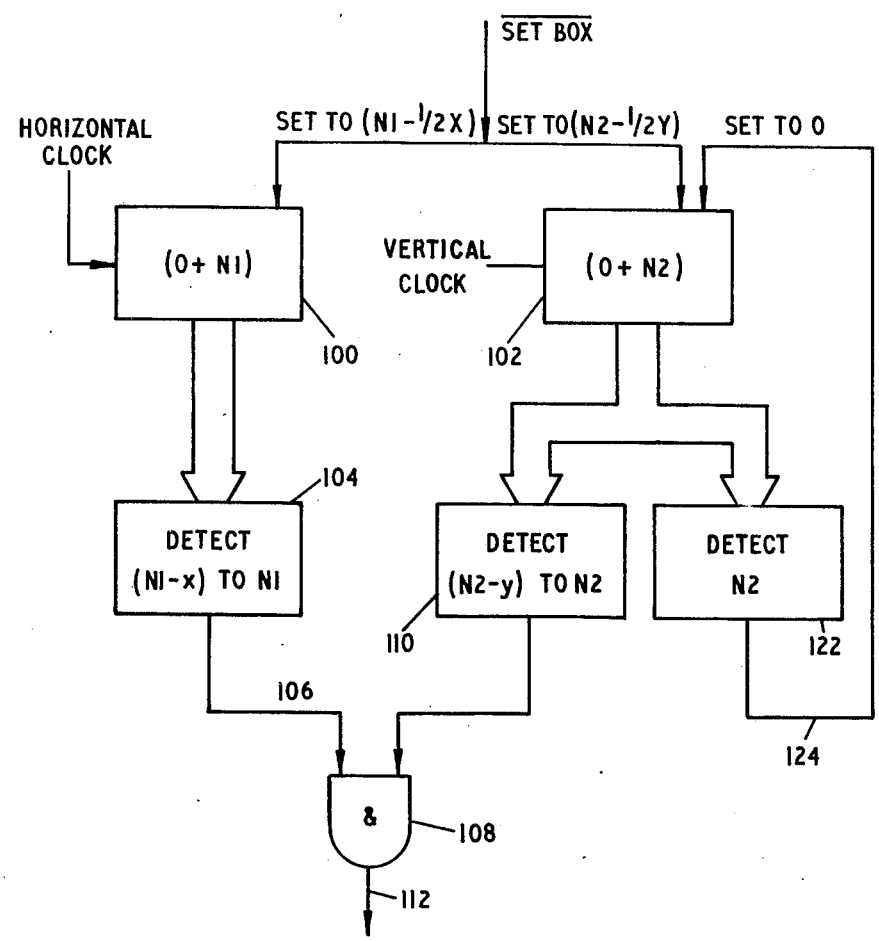
FIG. 7 is a circuit diagram of a signal generator for generating gating signals for selecting an ACP during subsequent scans and which when displayed in conjunction with the scanning define an area around the selected ACP signal in the scan.

FIG. 7 illustrates a combined memory and signal generator for producing the pulses for opening gate 11 of FIG. 1. The circuit comprises two electronic counters 100 and 102. The first has a count capacity of 1 to N1 (where (N1+1) is the number of picture points per line scan). The (N1+1) clock pulses appearing during each line scan are applied along the line marked horizontal clock to the counter 100 which therefore counts up to N1 during a line scan period and then resets itself to zero automatically. Alternatively if an overflow counter is employed, the overflow signal may be employed to reset the counter to zero.

The second counter 102 has a capacity of 0 to N2 (where N2 is the number of line scans per frame). Count pulses derived from the line synchronising pulses are applied along the line labelled vertical clock to the second counter 102 and as in the case of counter 100, counter 102 would register a count of N2 during a complete ordinary frame scan period.

Reverting again to counter 100, a digital comparator 104 is connected in parallel with the counter 100 set to detect count values in the counter 100 lying between and including the values (N1−X) to N1. When these values are detected a one condition exists along a line 106 which provides one input to AND-gate 108.

The other input of AND-gate 108 is supplied from a second digital comparator 110 set to detect when counter 102 registers an accumulated count value between the numbers (N2−Y) to N2 inclusive. When both comparators detect count values within their respective ranges, AND-gate 108 is fully satisfied and an output signal appears on line 112. This signal may be employed to gate the ACP line by opening and closing gate 11 in FIG. 1.

As shown in FIG. 1 the signals from the camera 3, comparator 5, ACP detector 7, gate 8 and gate 11 may be supplied to a monitor for displaying the field and selected ones of the signals derived from the video signal. A monitor 114 is shown in FIG. 1 and a feature 116 is shown in the field. The position of the ACP is shown at 118 and the box surrounding the ACP is denoted by reference numeral 120. The box can be produced in the video display on the monitor by supplying the signals from the output of AND-gate 108 in FIG. 7 to cause a bright up of the video display.

Counter 102 is assumed not to be self-resetting and a second detector 122 is provided which is set to detect when the counter reaches N2. At this point a reset signal is supplied along line 124 to reset the counter 102 to zero.

The circuit of FIG. 7 acts as a memory by the provision of two override signal paths to the two counters 100 and 102. When the circuit of FIG. 3 produces the $\overline{\text{Set box}}$ signal, this short duration negative going pulse is applied to the two override reset terminals of counters 100 and 102 and sets up a count value of (N1−1/2X) in counter 100 and a count value of (N2−1/2Y) in counter 102. The values of X and Y are set respectively to the number picture points for the horizontal extent of the box and the number of line scans vertical extent of the box. Thus X may for example be some 30 picture points and Y some 6 line scans. By setting each counter to its capacity less half the box width and height, the box is set symmetrically about the point in the scan which causes the box to be generated namely the ACP.

It will be seen that since the counters 100 and 102 continue to count at the clock pulse and line scan rate the detectors 104 and 110 will detect the selected ranges of numbers in the two counters immediately after an ACP has been received and a $\overline{\text{Set box}}$ signal has been applied to the circuit of FIG. 7. During successive frame scans at approximately the same point in the frame scan period the two counters will register the same count values again and the detectors 104 and 110 will again produce enabling pulses for AND-gate 108. In this way until another $\overline{\text{Set box}}$ signal is applied to the circuit of FIG. 7, the AND-gate 108 will continue to produce gating signals during the same short period during each frame scan thereby continuing to define a box around the ACP.

Figure 8:
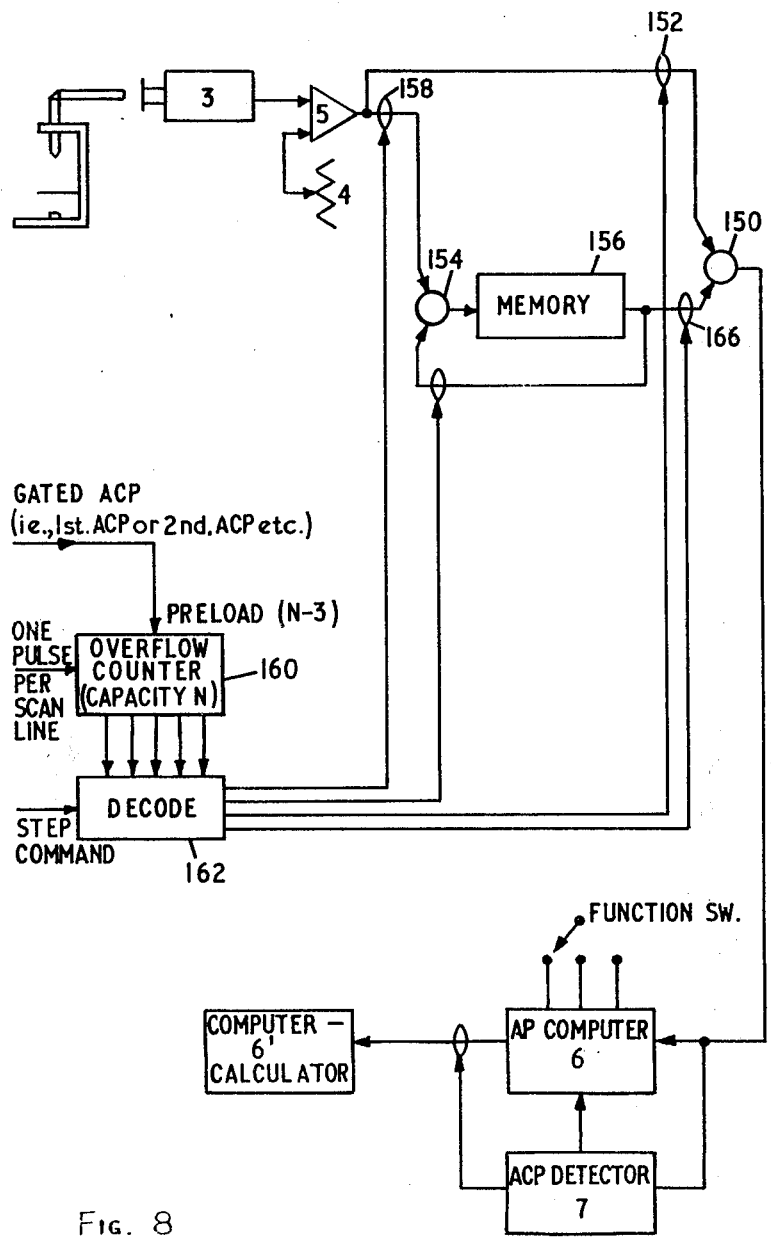
FIG. 8 is a block circuit diagram of a system employing a store for storing part of the signal during each scan to stabilise the signals arising just before and including a selected ACP signal.

Referring now to FIG. 8, a camera 3 generates an analogue type video signal the amplitude excursions of which are compared with a reference voltage from a potentiometer 4 in a comparator 5 for processing in an associated parameter computer 6 the output of which is released by a signal from an anti-coincidence pulse generating circuit 7 set to operate a gate 8 through which the information signal is passed to a further signal processing circuit such as a computer 6'. The operation of the overall circuit is such that the computer 6 computes a first parameter value (such as area) from the information supplied thereto during a first frame scan, a second parameter value (such as perimeter) from the information supplied thereto during the next frame scan and a different parameter during each subsequent frame scan. The computer 6' therefore includes a store for retaining the previous information signals from a feature whereby complex computations of parameters may be made in the computer 6' using different parameter values for a feature since all can be made available simultaneously. In particular shape factor and other secondary parameters obtained by combining mathematically two or more primary parameters such as area, perimeter, may be computed by the computer 6'.

The constant amplitude pulses from the detector 5 can be supplied direct to the computer 6 via OR-gate 150 when gate 152 is opened.

Alternatively the constant amplitude pulses may be supplied via OR-gate 154 into a memory 156 when gate 158 is opened. Memory 156 conveniently comprises a series of shift registers each capable of storing the detected signal pulses arising during a single line scan period of the scanner 3. The memory typically comprises five shift registers connected in series so that a total of five line scan periods can be stored.

The circuit operates as follows:

1. When the first ACP signal is detected during the first frame scan the counter 160 is pre-loaded with a number which is equal to the total number of line scans making up the field less 3. This number is determined by the number of lines which are to be stored in the memory 156. The counter 160 is of the so-called overflow type and a decoding device 162 associated therewith generates gating signals when the counter 160 reaches the overflow condition which is determined in advance as the number of line scans in the field. When the gating signals are generated in response to this condition, gate 158 is opened and gate 164 is closed. At the same time clock pulses normally supplied to the memory 156 are inhibited to prevent further cycling of the information. In this way the detected signal pulses from detector 5 appearing during the next three line scan periods following the appearance of the first ACP signal in the scan are stored in the memory 156 together with information arising during the preceding scans depending on the capacity of the memory 156. Typically the detected signal information arising during the two preceding line scan periods is stored in the memory 156 in advance of the position of the first ACP signal.

2. The counter 160 is supplied with one signal pulse per line scan and on overflow resets itself to zero. Subsequent line scan pulses trigger the counter 160 one unit per line scan and the decoding circuit 162 senses when the counter value is equal to the number of line scans in one frame scan less 5 (if 5 line scan periods is the total capacity of memory 156). On decoding this count value the coding circuit 162 supplies signals to gate 152 to close this gate and to open a gate 166. Simultaneously readout clock pulses are supplied to the memory 156 causing the information stored in the shift registers to be shifted in synchronism with the scanning of the camera 3 and to be supplied via the open gate 166 and OR-gate 150 to the computer 6 and ACP signal generating circuit 7 and also to be recirculated via line 168 through gate 164 and OR-gate 154 into the input of the memory 156. In this way the information stored in the memory is recycled and since gate 152 is closed, is substituted for the information from the corresponding scan lines from the scanner 3 in the input to the computer 6.

3. As previously described a separate controlling signal is supplied to the switching function of the computer 6 so that during successive frame scans a different parameter is measured from the detected signal pulses supplied to the computer 6 from the information supplied from the scan and the memory. After the last of the sequence of parameters has been measured by the computer 6 for the first feature which has been selected, a step command signal is generated by the control system (see FIG. 1) which RESETS the switching function of the computer 6 to measure the first parameter and the same signal is supplied to open gate 152, close gate 166, open gate 158 and close gate 164 when the end of the stabilised region is reached. The same step command signal maintains the supply of clock pulses to shift information in the memory 156 which enables the information in the memory 156 to be overwritten until the next ACP signal is detected whereupon the counter 160 is again pre-loaded with the appropriate count value (the number of line scans less 3 in the example quoted above) and the process of storing a new band of information in the memory 156 is repeated. During subsequent frame scans the information in the memory 156 is substituted for the corresponding scan lines from the scanner 3 in the manner previously described and during each successive frame scan a different parameter is computed by the computer 6 from the detected signal pulses supplied thereto for the new feature until all the different parameter measurements have been made on that feature.

In this way a succession of parameter measurements can be performed on each feature in a field of view and each of the features is dealt with in succession starting with the feature whose ACP signal occurs closest to the initiation of scanning of each frame scan and ending with the feature whose ACP signal occurs nearest to the last point in the frame scan.

We claim:

1. A method of analysing a field containing features and comprising the steps of scanning the field, generating a video signal corresponding to the field, comparing the video signal amplitude with at least one reference voltage to obtain constant amplitude detected signal pulses, generating from the detected signal pulses relating to each feature an ACP signal therefore after the last detected pulse for the feature, computing a value signal in a computing circuit relating to a parameter of the feature from the detected signal pulses which relate thereto and employing the ACP signal for the feature to release the value signal therefor, in which the further steps are provided of:

— storing in a first store electrical signals identifying the position of the first ACP signal to occur during an initial frame scan,
— employing the stored signals during a succeeding frame scan to select and store the value signal which is released by the first ACP signal,
— clearing the first store and inserting therein signals identifying the position of the next ACP signal to occur during scanning the field, and
— repeating the sequence of steps to obtain the corresponding value signals for each of the remaining features whose ACP signals are in turn identified.

2. The method as set forth in claim 1 comprising the further steps of:
— changing the function of the computing circuit to generate a value signal of a different feature parameter during at least one other succeeding frame scan,
— employing the signals stored in said first store to select and store a different value signal released by the first ACP signal during the said at least one other succeeding frame scan, and
— reverting the computing circuit to its first function before repeating the sequence of steps.

3. The method as set forth in claim 1 in which the information which is stored in the first store and identifies the position of an ACP signal, defines an area of the scanned field around the point during the scan corresponding to the position of the ACP signal whereby registration inaccuracies between successive frame scans, arising from noise and other factors, can be reduced.

4. The method as set forth in claim 2 further comprising the steps of storing in a second store during an initial scan, signals arising just before and during production of a selected ACP signal, during subsequent scans releasing the stored signals in place of the corresponding signals which arise during the same interval in said subsequent frame scans, re-circulating the released signals to said storage means to be available for later ones of said subsequent frame scans and clearing said second store when said first store is cleared to render said second store available to store a fresh set of signals associated with the position of the next selected ACP signal, thereby to stabilise the information obtained from the scanning from one frame scan to the next.

5. The method as set forth in claim 4 in which the signals which are stored in the second store are the actual video signals obtained from the scanning device.

6. The method as set forth in claim 4 in which the signals which are stored in the second store are a digitised version of the signals obtained from the scanning device.

7. The method as set forth in claim 4 in which the signals which we stored in the second store are the detected signal pulses obtained by comparing the video signal amplitude with a reference voltage.

8. The method as set forth in claim 1 comprising the further steps of performing a preliminary computation on the detected signal pulses from each selected feature and generating a "pass" or "fail" signal depending on whether the results of the preliminary computation satisfy a given criterion, causing the analysis to proceed to that feature, if a pass signal is generated, as soon as said first store is cleared and causing the information identifying the position of the ACP signal of that feature to be cancelled if a fail signal is generated to cause the system to search for the next following ACP signal, thereby reducing the time required for the complete analysis.

9. A method as set forth in claim 1 further comprising the steps of supplying the video signal to a television display monitor and displaying an image of the scanned field thereon, deriving brightness control signals from the signals stored in said first store and supplying them to the display monitor in syndronism with the scanning to bright-up an area in the display of the field in the proximity of the feature display therein for which the ACP signal has been selected.

10. Apparatus for analysing features in a field in sequence comprising:
a. means for scanning the field containing the features and generating a video signal corresponding to the field,
b. means for comparing the video signal amplitude with at least one reference voltage to obtain constant amplitude detected signal pulses corresponding to the detected features in the field,
c. circuit means responsive to the detected signal pulses for generating an ACP signal for each detected feature after the last detected signal pulse for the feature,
d. a computing circuit adapted to compute a value signal relating to a parameter of a detected feature from the detected signal pulses which relate thereto and responsive to the ACP signal for the feature to release the value signal therefor,
e. first signal storage means for storing electrical signals identifying the position of the first ACP signal to occur during an initial frame scan,
f. means for releasing the stored signals from the first store during a succeeding frame scan,
g. further storage means,
h. circuit means responsive to the released signals to select and store in said further storage means the value signal which is released by the first ACP signal,
i. means for clearing the first store and inserting therein signals identifying the position of the next ACP signal to occur during scanning the field, and
j. means for causing the apparatus to repeat the sequence of operations to obtain the corresponding value signals for each of the remaining features whose ACP signals are in turn identified.

11. Apparatus as set forth in claim 10 further comprising:
a. means for changing the function of the computing circuit to generate a value signal of a different feature parameter during at least one other succeeding frame scan, the signals stored in said first store serving to select and store in said further storage means the different value signal released by the ACP signal during said at least one other succeeding frame scan, and
b. means for reverting the computing circuit to its first function before repeating the sequence of steps.

12. Apparatus as set forth in claim 10 comprising:
a microscope for forming an image of the field containing the features to be analysed, a television camera adapted to receive said image, means for generating an electrical signal which inhibits operation of the apparatus until the microscope stage is ready, and the field is correctly focused.

13. Apparatus as set forth in claim 10 comprising means for generating a terminate signal after the last value signal has been obtained for the last feature in a field to be analysed, and means for stepping the microscope stage operated by a terminate signal to step the stage by one field of view in the appropriate direction so as to present automatically the next part of the specimen for analysis.

14. Apparatus as set forth in claim 10 further comprising circuit means responsive to the signals stored in said first store to generate therefrom brightness control signals, a television display monitor, means for supplying thereto the video signal relating to the field to produce a display thereon of the scanned field and means for supplying thereto the said brightness control signals to bright-up an area in the display of the field in the proximity of the feature displayed therein for which the ACP signal has been selected.

* * * * *